Figures 1, 2:
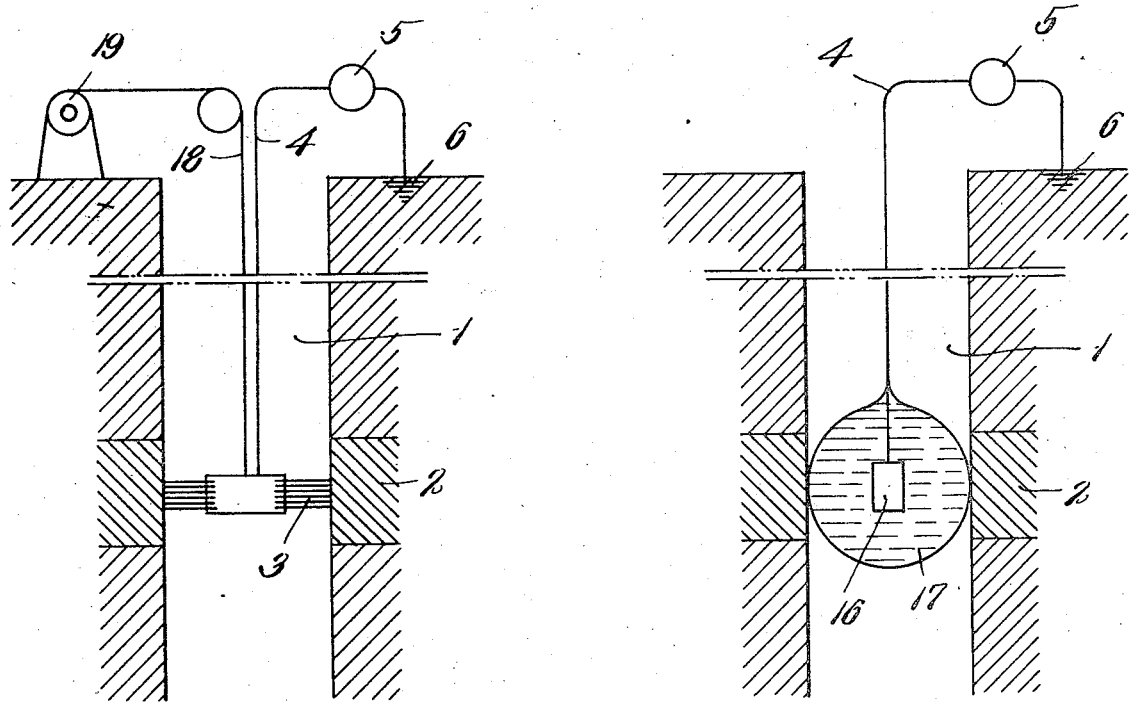

March 4, 1941.  E. G. LEONARDON  2,233,420

METHOD OF AND APPARATUS FOR EXPLORING DRILL HOLES

Filed June 4, 1937

Inventor.
E. G. Leonardon
by David Rines
att'y.

Patented Mar. 4, 1941

2,233,420

UNITED STATES PATENT OFFICE 2,233,420

METHOD OF AND APPARATUS FOR EXPLORING DRILL HOLES

Eugene Gilbert Leonardon, Houston, Tex., assignor to Schlumberger Well Surveying Corporation, Houston, Tex., a corporation of Delaware Application June 4, 1937, Serial No. 146,429

19 Claims. (Cl. 175—182)

The present invention relates to the exploration of drill holes in the earth, and more particularly drill holes that do not contain a column of electrically conductive liquid.

It is possible, as explained in Letters Patent of the United States 1,913,293 and 1,970,342, to determine the existence of porous beds by utilizing the spontaneous potential differences that occur between the walls of the porous beds and the electrically conducting column of impure water or mud contained in drill holes traversing those beds to measure or de ct a characteristic property or properties of the porous strata surrounding the drill hole. These spontaneous potential differences are the direct result of the presence of the column of mud or other conductive liquid in the drill hole for they are caused by one or both of two factors: first, electro-filtration phenomena inside the porous beds; and, secondly, electro-chemical phenomena arising out of contact between the column of mud or other conducting liquid in the drill hole and the electrolyte contained in the porous beds. It could not, therefore, be supposed that the methods of the above-entitled Letters Patent, depending, as they do, upon the presence of a column of mud or other conductive liquid that is responsible for the existence of those two factors, could be utilized in drill holes that are either empty or are filled with some non-conducting fluid, such as oil.

An object of the present invention is to provide a new and improved method of and apparatus for exploring porous beds traversed by drill holes not containing a column of conductive liquid. If spontaneous potential differences do not exist in the neighborhood of the porous beds, they may be artificially created. The existence of the porous beds is demonstrated by measuring these potential differences. The method is applicable to the measurement or detection of changes in the electrical resistivity, as well as other characteristics of the porous beds.

Other and further objects will be explained hereinafter and will be particularly pointed out in the appended claims.

The scientific reasons underlying the phenomenon of spontaneous potentials in drill holes which are not partially or completely filled with a column of conductive liquid have not yet been clearly determined. However, in order that the method and apparatus of the present application may be clearly understood, it will be advantageous to present a theory explaining this phenomenon, which, while it may not be technically correct, is known to fit the observed experimental facts. It is to be understood, of course, that the invention is not to be limited in any way by the explanation given.

According to the present knowledge of the question, the presence of spontaneous potentials in drill holes of the character under consideration is due to a number of different causes. It seems that two adjacent formations of different lithological composition, and containing electrolytes of different salinity, may show differences of potential between them. This takes place particularly at the interface between a porous layer such as sand, and an impervious layer, such as clay.

Furthermore, it is quite likely that the walls of a drill hole, whether empty or filled with oil, are not only wet, but may even be covered by a thin film of streaming water coming from the upper water-bearing sands whose inside pressure exceeds that of the atmosphere. Differences between the salinity of this water and the salinity of fluid contained in the beds may give rise to other potentials in addition to those developed between adjacent porous and impervious beds.

An additional difference in potential is observed when an electrode, constituted of a metal or a metal and its salt, is placed in contact with the formations, which is probably generated by the contact of the electrode with the electrolyte in the formations. These potentials seem to be substantially constant when the electrode engages any impervious formation whatsoever, and they seem to change substantially when the electrode crosses the boundary between a porous region such as sand, and an impervious region such as clay. Furthermore, it appears that these potentials are greater in magnitude than the two others mentioned above.

The spontaneous potentials measured in drill holes which do not contain a column of conductive liquid appear to be the sum of the potentials discussed above. These potentials evidently are all a function of the nature of the beds and their fluid content, so that by their measurement, the character of the strata surrounding a bore hole of this nature may be readily determined.

Figure 3:
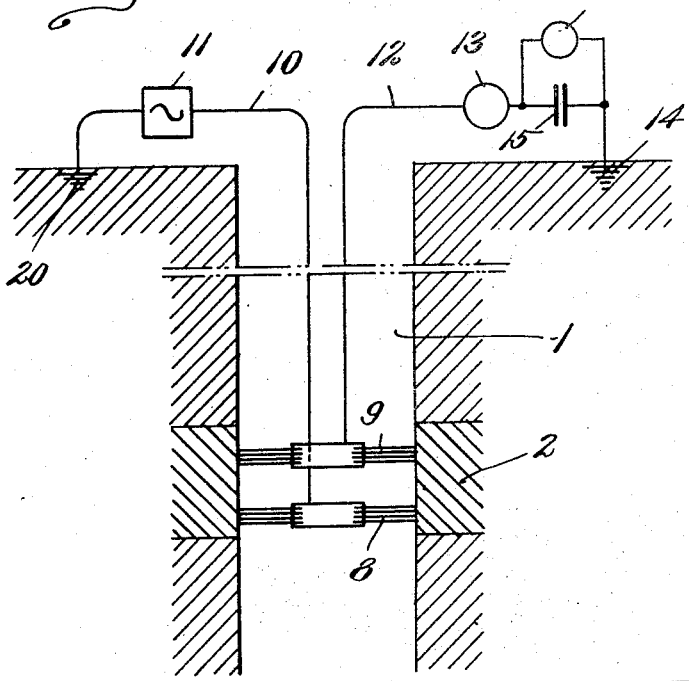

The invention will now be described more fully in connection with the accompanying drawing, Fig. 1 of which is a vertical section of a vertically disposed drill hole diagrammatically illustrating one embodiment of the invention; and Figs. 2 and 3 are similar sections illustrating modifications.

A drill hole 1, traversing strata including a bed or beds containing an electrolyte or electrolytes, such as the bed or beds 2, is assumed to be empty, or to contain a non-conducting fluid, such as oil. If spontaneous differences exist on the wall of the drill hole, they may be detected, according to the present invention, by rubbing an electrode over the wall of the drill hole, in the neighborhood of the porous bed 2. This may be effected by lowering the electrode down into the drill hole, while maintaining it in contact with the walls of the drill hole, in any desired way, as by unwinding an insulated cable 18, to which the electrode is secured, from a drum 19 that is positioned on the surface of the earth.

The electrode 3 is diagrammatically shown connected by an insulated cable conductor 4 to any desired potential-measuring apparatus 5, positioned preferably on the surface of the earth. The cables 4 and 18 may, if desired, be the same, as will be understood from Figs. 2 and 3, but they are shown separated in Fig. 1, to avoid confusion. The apparatus 5, as is customary, is provided with two terminals, one of which is connected to the insulated cable conductor 4, and the other of which is grounded at 6.

The electrode 3 is illustrated in Fig. 1 as in the form of a circular mechanical brush, shaped similarly to a chimney-sweep's brush, and the peripheral portions or ends of which will rub against the wall of the drill hole as it is lowered into the drill hole. The metal of the brush 3 may preferably be such as to give rise to substantial variations in the electromotive forces of contact between the electrode and the earth formations against which it rubs. As the electrode 3 is lowered through the drill hole, therefore, the potential differences between it and the walls of the drill hole will vary in accordance with whether it engages impervious beds, or porous beds 2. These differences of potential will be recorded by the apparatus 5. The lowering is effected either by relatively short steps, a little at a time, or continuously, and observations are made with the apparatus 5 orally, visually or graphically, either at the end of each step of lowering movement or continuously. By plotting the potential differences thus recorded as a function of the depth of the electrode 3 in the drill hole, both the existence and the position of the porous beds will be readily determined.

Where the measurements are recorded in a continuous manner, the rubbing of the metal brush along the walls of a bore hole gives rise to the known phenomenon of tribo-polarization or friction potentials. The nature of these potentials has not yet been clearly established.

In order to reduce the effects of friction potentials which occur when metal electrodes are used, non-polarizing electrodes such as are shown in Fig. 2, comprising a porous bag 17 containing a metal body 16 immersed in a concentrated solution of the salt of the same metal may be used. The dimensions of the bag 17 are so chosen that its walls will move in contact with the walls of the drill hole as it is lowered therein. The electrolyte in the bag 17 will seep through its pores and will thus communicate with the electrolyte contained in the porous beds, giving rise to variations in the electromotive forces of contact, with the same results as described above in connection with the brush 3. Inasmuch as the metal electrode is immersed in a saturated solution of one of its own salts, the potential difference between it and the solution is constant.

In those cases where potential differences do not exist spontaneously in the wall of the drill hole, potentials may be created by direct contact between the electrode and the electrolyte contained in the porous beds. It is then preferable that the electrode be constituted of a material such as to give rise to substantial variations in the electromotive forces of contact between the electrode and the electrolyte contained in the porous beds. Metals such as steel or copper are usually suitable materials, but the material employed would naturally vary according to the fluid—such as oil, fresh or salt water, or water containing different chemicals in solution—present in the porous beds to be explored. If, for example, one were seeking to locate porous beds in a territory where such beds carry sulphur water, one would employ an electrode material that would give an appreciable reaction with the sulphur water—such as copper, or brass, or silver. The created potential differences are indicative of the nature of the formations as suggested above, and they may then be measured to determine the existence of the porous beds in the same manner as before described.

In accordance with a feature of the invention, the resistivity of the beds traversed by the drill hole may be measured simultaneously with the potential differences at successive points of the drill hole. To this end, one or several electrodes of the above-described character may be employed to send a current into the formations surrounding the drill hole, and the effects produced by the passage of this current through the formations may then be studied. Two such electrodes are shown at 8 and 9 in Fig. 3 for purposes of illustration. The electrodes 8 and 9, preferably maintained at a constant distance apart, may be lowered through the drill hole in any well-known manner, as by means of the cable 18.

The electrode 8 is shown connected by an insulated conductor 10 to one pole of a source 11 of alternating current positioned at the surface of the earth, the other pole being grounded at 20. An alternating electromagnetic field is thus created in the strata in the neighborhood of the electrodes 8 and 9.

The electrode 9 is shown connected by an insulated conductor 12 to apparatus for measuring both the alternating and the direct potential differences between the electrode 9 and the ground 14. The apparatus for measuring the alternating potential differences comprises an instrument 13; and that for measuring the direct potential differences an instrument 16. The instrument 13, which is sensitive to alternating potential differences only, has two terminals, one of which is connected to the conductor 12. The instrument 16, which is sensitive to direct potential differences only, has two terminals, one of which is connected to the other pole of the instrument 13 and the other of which is grounded at 14. A condenser 15 is connected in parallel to the instrument 16 and in series to the instrument 13.

The instrument 16 will therefore measure those differences of potential only that are caused by the electrode 9 rubbing against the walls of the porous bed 2. The instrument 13, on the other hand, will measure the potential differences produced in the neighborhood of the electrode 9 by the current sent into the earth strata by means of the electrode 8 from the source 11 of alternating current. With the aid of these measurements, it is possible, in ways well known, to determine simultaneously both the resistivity of the beds traversed by the drill hole and the potential differences arising in the neighborhood of the porous bed 2.

It is of great value to obtain the measurements of the potential differences and the resistivity at various points of the drill hole, as the electrodes are successively carried past those points, with the use of the same apparatus, as difficulties involved in manipulating long, heavy cables into drill holes become thereby minimized.

Further modifications will occur to persons skilled in the art and all such are considered to fall within the spirit and scope of the invention as defined in the appended claims.

What is claimed is:

1. A method of exploring a drill hole not containing a column of conductive liquid that comprises measuring spontaneous potential differences at different points along the wall of the drill hole.

2. A method of exploring a drill hole not containing a column of conductive liquid that comprises causing a conducting electrode to engage different points along the wall of the drill hole, and measuring the spontaneous potential differences between the electrode at the said different points and the ground.

3. A method of exploring a drill hole not containing a column of conductive liquid that comprises creating an alternating electromagnetic field in the earth in the neighborhood of the drill hole, measuring the alternating potential of the field between different points along the wall of the drill hole and a ground, and measuring the direct potential between different points along the wall of the drill hole and the ground.

4. A method of exploring a drill hole not containing a column of conductive liquid that comprises measuring the spontaneous potential difference and the resistivity of the beds traversed by the drill hole at different points along the wall of the drill hole.

5. Apparatus for exploring porous beds traversed by a drill hole not containing a column of conductive liquid comprising an electrode, means for moving the electrode through the drill hole in engagement with the walls of the drill hole, and means for measuring the spontaneous potential differences between the electrode and the walls of the drill hole.

6. Apparatus for locating electrolyte-containing porous beds traversed by a drill hole not containing a column of conductive liquid comprising a conducting electrode, means for moving the electrode through the drill hole in engagement with the walls of the drill hole, the electrode being constituted of material such as to give rise to substantial variations in the electromotive forces of contact between the electrode and the electrolyte contained in the porous beds, and means for measuring the electromotive forces produced at the points of contact between the electrode and the wall of the drill hole.

7. Apparatus for locating porous beds traversed by a drill hole not containing a column of conductive liquid comprising a conducting electrode, means for moving the electrode through the drill hole in engagement with the walls of the drill hole, the electrode being constituted of a metal brush rubbing against the walls of the drill hole, and means for measuring the electromotive forces produced at the contact between this electrode and the walls of the drill hole.

8. Apparatus for exploring a drill hole not containing a column of conductive liquid comprising a metal brush, means for moving the brush through the drill hole in engagement with the walls of the drill hole, means connecting the brush with a ground, and means connected with the connecting means for measuring the potential difference between the electrode and the ground.

9. Apparatus for locating porous beds traversed by a drill hole not containing a column of conductive liquid comprising a conducting electrode, and means for moving the electrode in engagement with the walls of the drill hole, the electrode comprising a metal brush in contact with the walls of the drill hole.

10. Apparatus for exploring a drill hole not containing a column of conductive liquid comprising an electrode, the electrode comprising a metal brush, means for moving the electrode through the drill hole in engagement with the walls of the drill hole, and means for measuring the potential differences between the electrode and the ground.

11. Apparatus for measuring the resistivity of the earth formations traversed by a drill hole not containing a column of conductive liquid comprising a plurality of metal brushes rubbing against the walls of the drill hole, means for sending an electric current through one or more of these electrodes, and means for measuring the effects of the passage of this electric current through the walls of the drill hole.

12. Method for determining electrolyte-containing porous beds traversed by a drill hole not containing a column of electrically conductive fluid, consisting in measuring at successive depths by means of an electrode in contact with the walls of said drill hole, the potential differences occurring at the contact between the electrode and the electrolyte in the porous bed.

13. Apparatus for measuring the resistivity of the earth formations traversed by a drill hole not containing a column of conductive liquid comprising a single metal brush, means for moving the brush through the drill hole in engagement with the walls of the drill hole, means connecting the brush with a ground, means for sending an electric current into the earth between the electrode and the said ground, and means for measuring the effects of the passage of this electric current through the walls of the drill hole.

14. Apparatus for measuring the resistivity of the earth formations traversed by a drill hole not containing a column of conductive liquid comprising a conducting electrode, the electrode comprising a bag of porous material containing an electrolyte, means for moving the electrode through the drill hole in engagement with the walls of the drill hole, means for connecting the electrode with a ground, means for sending a current into the earth between the electrode and the said ground, and means for measuring the effects of the passage of this electric current through the walls of the drill hole at different points of the drill hole to measure the said resistivity at the said points.

15. Apparatus for exploring a drill hole not containing a column of conductive liquid comprising two electrodes, means for moving the electrodes through the drill hole in engagement with the walls of the drill hole and maintaining them at a constant distance from each other during such movement, means connecting one of the electrodes with a ground, means for sending a current into the earth through the other electrode, means for measuring the effects of the passage of this electric current through the walls of the drill hole, and means for measuring the electromotive forces produced at the points of contact between the said one electrode and the walls of the drill hole.

16. Apparatus for locating porous beds traversed by a drill hole not containing a column of conductive liquid comprising a conducting electrode, and means for moving the electrode in engagement with the walls of the drill hole, the electrode comprising a porous bag in contact with the walls of the drill hole and containing an electrolyte.

17. Apparatus for exploring a drill hole not containing a column of conductive liquid comprising an electrode, the electrode comprising a bag of porous material containing an electrolyte, means for moving the electrode through the drill hole in engagement with the walls of the drill hole, and means for measuring the potential differences between the electrode and the ground.

18. A method of exploring a drill hole not containing a column of conductive liquid comprising the steps of causing a non-polarizing conducting electrode to engage different points along the wall of the drill hole, and measuring the spontaneous potential differences between the electrode at the said different points and the ground.

19. Apparatus for exploring porous beds traversed by a drill hole not containing a column of conductive liquid comprising a non-polarizing electrode, means for moving the electrode through the drill hole in engagement with the walls thereof, and means for measuring the spontaneous potential differences between the electrode and the walls of the drill hole.

E. G. LEONARDON.